(12) United States Patent
Divan et al.

(10) Patent No.: US 9,325,171 B2
(45) Date of Patent: Apr. 26, 2016

(54) IMPUTE DC LINK (IDCL) CELL BASED POWER CONVERTERS AND CONTROL THEREOF

(71) Applicants: Deepakraj M. Divan, San Jose, CA (US); Anish Prasai, San Jose, CA (US); Jorge Hernendez, Smyrna, GA (US); Rohit Moghe, Atlanta, GA (US); Amrit Iyer, Atlanta, GA (US); Rajendra Prasad Kandula, Atlanta, GA (US)

(72) Inventors: Deepakraj M. Divan, San Jose, CA (US); Anish Prasai, San Jose, CA (US); Jorge Hernendez, Smyrna, GA (US); Rohit Moghe, Atlanta, GA (US); Amrit Iyer, Atlanta, GA (US); Rajendra Prasad Kandula, Atlanta, GA (US)

(73) Assignee: GEORGIA TECH RESEARCH CORPORATION GEORGIA INSTITUTE OF TECHNOLOGY, Atlanta, GA (US)

(*) Notice: Subject to any disclaimer, the term of this patent is extended or adjusted under 35 U.S.C. 154(b) by 660 days.

(21) Appl. No.: 13/757,731

(22) Filed: Feb. 1, 2013

(65) Prior Publication Data
US 2013/0207471 A1    Aug. 15, 2013

Related U.S. Application Data

(60) Provisional application No. 61/593,546, filed on Feb. 1, 2012, provisional application No. 61/611,333, filed on Mar. 15, 2012.

(51) Int. Cl.
H02J 1/10 (2006.01)
H02J 3/00 (2006.01)
H02J 3/36 (2006.01)

(52) U.S. Cl.
CPC ..... *H02J 3/00* (2013.01); *H02J 3/36* (2013.01); *Y02E 60/60* (2013.01); *Y10T 307/50* (2015.04)

(58) Field of Classification Search
CPC ............... H02M 5/4585; H03K 17/005
See application file for complete search history.

(56) References Cited

U.S. PATENT DOCUMENTS 8,710,903 B2 * 4/2014 Oraw et al. ............. H02M 3/07
                                                    327/337
9,124,265 B2 * 9/2015 Dykstra ............... H03K 17/005

* cited by examiner

*Primary Examiner* — Kenneth B Wells
*Assistant Examiner* — Rafael Pacheco
(74) *Attorney, Agent, or Firm* — Sheppard Mullin Richter & Hampton LLP

(57) ABSTRACT

Power flow controllers based on Imputed DC Link (IDCL) cells are provided. The IDCL cell is a self-contained power electronic building block (PEBB). The IDCL cell may be stacked in series and parallel to achieve power flow control at higher voltage and current levels. Each IDCL cell may comprise a gate drive, a voltage sharing module, and a thermal management component in order to facilitate easy integration of the cell into a variety of applications. By providing direct AC conversion, the IDCL cell based AC/AC converters reduce device count, eliminate the use of electrolytic capacitors that have life and reliability issues, and improve system efficiency compared with similarly rated back-to-back inverter system.

12 Claims, 17 Drawing Sheets

IMPUTE DC LINK (IDCL) CELL BASED POWER CONVERTERS AND CONTROL THEREOF

CROSS-REFERENCE TO RELATED APPLICATIONS

This application claims benefit of U.S. Provisional Patent Application No. 61/593,546, filed on Feb. 1, 2012, entitled "3 Level Direct AC/AC Converter with Imputed DC Link (IDCL) Converter Cells and Active Snubber", and U.S. Provisional Patent Application No. 61/611,333, filed on Mar. 15, 2012, entitled "Active AC Snubber for Direct AC/AC Power Converters," which are hereby incorporated herein by reference in its entirety.

STATEMENT OF RIGHTS TO INVENTIONS MADE UNDER FEDERALLY SPONSORED RESEARCH

This invention was made with Government support under DE-AR0000108 awarded by the United States Department of Energy. The Government has certain rights in the invention.

TECHNICAL FIELD

The present invention(s) relate generally to controlling power flow in an electric power system. More particularly, the invention(s) relate to power flow controllers that are based on Imputed DC Link (IDCL) cells.

DESCRIPTION OF THE RELATED ART

An electric power system is a network of interconnected electrical equipment that generates, transmits, and consumes electric power. Electric power is delivered to consumers through a transmission network and a distribution network from generators to consumers. The transmission network and the distribution network are often known as the transmission grid and the distribution grid, respectively. Operation of the transmission grid and the distribution grid was once straightforward before the deregulation of the electric power market, but became extremely complex as a result of the competition among various utility companies. Increased amount of electric power is flowing in the electric power system and causing congestion and overflow in certain parts of the electric power system, which may limit the capacity and also impact the reliability of the electric power system. As the electric power system is highly dynamic, real-time power flow control ensures the electric power system's reliability and increases its capacity and efficiency. As a result, the increasing load demand, increasing level of penetration of renewable energy and limited transmission infrastructure investments have significantly increased the need for a smart dynamically controllable grid.

Traditionally, power flow control has been achieved by generator control, shunt VAR compensation and LTC tap settings. However, the range of control achieved is not very significant and the dynamic response is very slow. Various devices can be installed on the electric power system to perform electric power flow controls such as a Phase Angle Regulator (PAR), also known as a Phase Shifting Transformer (PST), a Unified Power Flow Controller (UPFC), and a Back-to-Back (BTB) HVDC link.

PARs or PSTs correct the phase angle difference between two parallel connected electrical transmission systems and thereby control the power flow between the two systems so that each can be loaded to its maximum capacity. Conventional PARs and PSTs insert a series voltage to a phase that is in quadrature with the line-to-neutral voltage. However, conventional PARs or PSTs cannot control the reactive power flow independently from the active power flow. Their dynamic capabilities, if they exist, are also very limited.

UPFCs consist of two inverters with an intermediate DC bus with energy storage. One inverter is connected in shunt through transformer, while the second inserts a series voltage in the line, again through transformer coupling. UPFCs typically can insert a desired series voltage, balancing average power flow using the shunt inverter. This allows a UPFC to source or sink active and reactive power. UPFCs are typically used at very high power and voltage levels (such as 100 MW @ 345 KV). The need for UPFCs to survive faults and abnormal events on the grid makes their design complex and expensive because the series transformers and inverters for operation under system faults are large and expensive. Moreover, the shunt transformer and inverters for operation under transient voltages also add cost. As a result, although UPFCs have been commercially available for decades, few have been deployed.

BTB HVDC links consist of two inverters with an intermediate DC bus with energy storage. BTB HVDC links provide a wide control range (+/−1 p.u.) for both active and reactive power. However, for a 1 p.u. control range, the converter has to be rated for at least 2 p.u. (two converters of 1 p.u. each). Building such high power controllers for transmission or sub-transmission systems is extremely complex and expensive. Also, the size and complexity may affect their reliability. As the two inverters are connected in series, effectively a single point of failure in the system is created.

BRIEF SUMMARY OF EMBODIMENTS OF THE INVENTION

According to various embodiments of the invention, power flow controllers based on Imputed DC Link (IDCL) cells are provided. The IDCL cell is a self-contained power electronic building block (PEBB). The IDCL cell may be stacked in series and parallel to achieve power flow control at higher voltage and current levels. Each IDCL cell may comprise a gate drive, a voltage sharing module, and a thermal management component in order to facilitate easy integration of the cell into a variety of applications. By providing direct AC conversion, the IDCL cell based AC/AC converters reduce device count, eliminate the use of electrolytic capacitors that have life and reliability issues, and improve system efficiency compared with similarly rated back-to-back inverter system.

Various embodiments provide dynamic control of both active and reactive power of a power system. IDCL converters may insert a voltage with controllable magnitude and phase between two AC sources; thereby effecting control of active and reactive power flows between the two AC sources. In one embodiment, a transformer is augmented with fractionally rated IDCL cells. In various embodiments, low-rating insulated gate bipolar transistors (IGBTs) are used as switches in the IDCL cells.

An IDCL cell based AC/AC converter provides control of both the active and reactive power flow between two AC sources at the same frequency. In various embodiments, the IDCL cell based AC/AC converter may comprise a set of IDCL cells. By controlling the switches of each IDCL cell, the effective phase angle between the two AC source voltages may be regulated, and the amplitude of the voltage inserted by the power flow controller may be adjusted with respect to the AC source voltages. Various embodiments may be implemented at various voltage levels such as 13 kV.

In various embodiments, the voltage sharing module may be an active snubber. The active snubber may be coupled across each switch of an IDCL cell. The active snubber circuit projects a half-wave rectified waveform across each switch of the IDCL cell, ensuring equal voltage sharing and protecting against faults and incorrect commutation sequences. As such, IDCL cells may be stacked in series to scale up in voltage.

Various embodiments comprise existing grid assets (for example, transformers and capacitors) augmented with one or more IDCL cells. As such, existing grid assets' functionalities such as controlling active and reactive power flow are improved. In one embodiment, transformer retrofitting is provided. Accordingly, these devices may be used in a variety of applications, such as congestion management, renewable generation integration, conservation voltage regulation, merchant transmission, active power and reactive power dispatch, and radial-to-meshed grid conversion.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
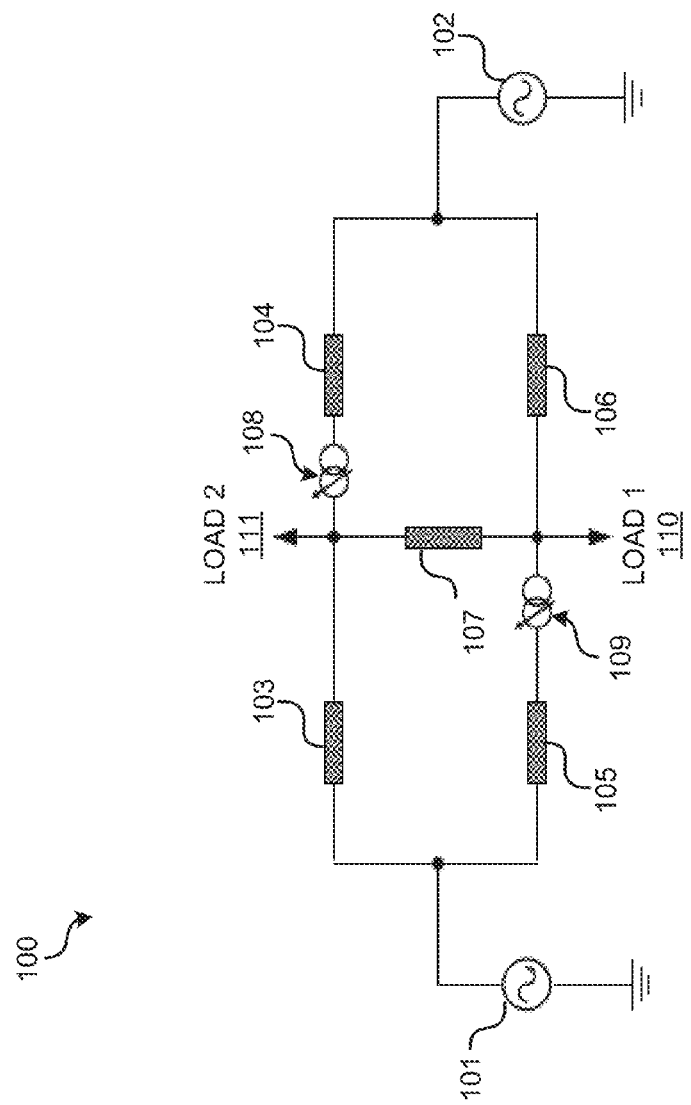
FIG. 1 illustrates an exemplary system diagram of an electric power system where various embodiments of the invention can be implemented.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

According to various embodiments of the invention, power flow controllers based on Imputed DC Link (IDCL) cells are provided. The IDCL cell is a self-contained power electronic building block (PEBB). The IDCL cell may be stacked in series and parallel to achieve power flow control at higher voltage and current levels. Each IDCL cell may comprise a gate drive, a voltage sharing module, and a thermal management component in order to facilitate easy integration of the cell into a variety of applications. By providing direct AC/AC conversion, the IDCL cell based AC/AC converters reduce device count, eliminate the use of electrolytic capacitors that have life and reliability issues, and improve system efficiency compared with similarly rated back-to-back inverter system.

Various embodiments comprise an IDCL cell implemented in power converter augmented transformer (PCAT) applications and may control power flows. The IDCL cell is rated only a fraction of the transformer voltage and is considered to be a thin AC converter ("TACC"). The IDCL cell may be scalable to higher voltage levels such as medium voltage and higher power levels through series and parallel connections of the cells, respectively, and realizes inherently safe, robust, and reliable operation through "fail-normal" operation. The ability to use TACC's in conjunction with existing grid assets in retrofit applications reduces capital required for infrastructure build-out, enhances reliability through a "fail-normal" function where the converter is bypassed and original asset functionality is preserved, and expands opportunities for deployment with various passive assets such as transformers and capacitors that can benefit from augmented features to provide power flow control functionalities.

Various embodiments provide dynamic control of both active and reactive power of a power system. IDCL cell based AC/AC converters may insert a voltage with controllable magnitude and phase between two AC sources; thereby effecting control of active and reactive power flows between the two AC sources. In one embodiment, a transformer is augmented with fractionally rated IDCL cells. In various embodiments, low-rating insulated gate bipolar transistors (IGBTs) are used as switches in the IDCL cells.

An IDCL cell based AC/AC converter provides control of both the active and reactive power flow between two AC sources at the same frequency. In various embodiments, the IDCL cell based AC/AC converter may comprise a set of IDCL cells. By controlling the switches of each IDCL cell, the effective phase angle between the two AC source voltages may be regulated, and the amplitude of the voltage inserted by the power flow controller may be adjusted with respect to the AC source voltages. Various embodiments may be implemented at various voltage levels such as 13 kV.

In various embodiments, the voltage sharing module may be an active snubber. The active snubber may be coupled across each switch of an IDCL cell to provide safe operation and ensure dynamic and static voltage sharing among the series-connected devices. The active snubber circuit projects a half-wave rectified waveform across each switch of the IDCL cell and limits the maximum voltage blocked by the switch at all operating conditions. Voltage sharing is warranted and the devices comprised in an IDCL cell are protected against faults and incorrect commutation sequences. With the voltage sharing functionality assured, IDCL cells using smaller, low-rated switches may be stacked in series to scale to higher voltage levels.

In various embodiments, existing grid assets (for example, transformers and capacitors) may be augmented with one or more IDCL cells, thereby improving their functionalities such as controlling active and reactive power flow. As such, these devices may be used in a variety of applications, such as congestion management, renewable generation integration, conservation voltage regulation, merchant transmission, active power and reactive power dispatch, and radial-to-meshed grid conversion.

Before describing the invention in detail, it is useful to describe a few example environments within which the invention can be implemented. One such example is that of illustrated in FIG. 1.

FIG. 1 illustrates an exemplary system diagram of an electric power system 100 where various embodiments of the invention can be installed. The electric power system 100 comprises generators 101 and 102; loads 110 and 111; and transmission lines 103-107, which may have different ratings and are loaded differently. One or more IDCL-cell-based PCATs may be deployed to the power system 100. A PCAT may comprise a new transformer or an existing transformer of the power system 100 augmented with IDCL cells. In the illustrated example, two PCATs 108 and 109, both of which comprise one or more IDCL cells, are installed in the power system 100. As a result of this installation, both active and reactive power flows along each of the transmission lines in the power system 100 may be controlled. From time-to-time, the present invention is described herein in terms of this example environment. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 2A:
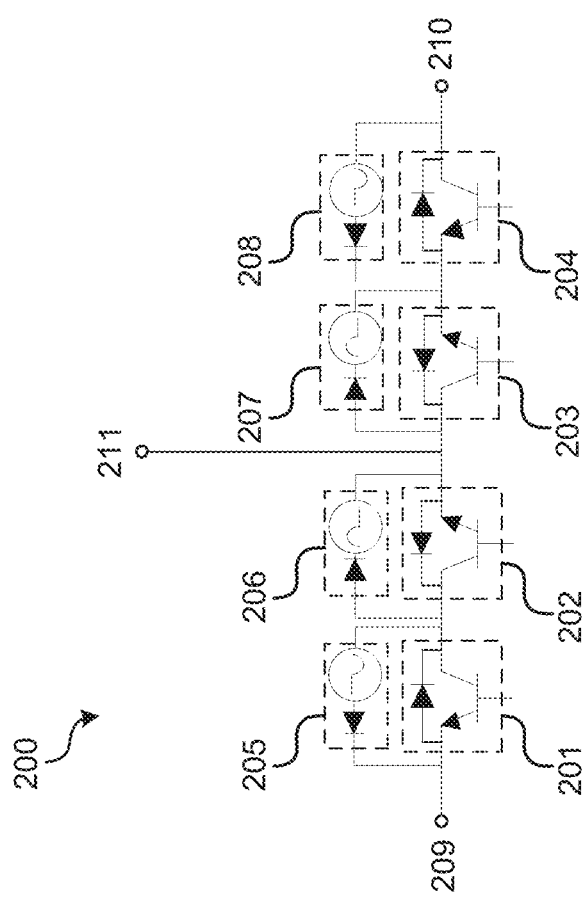
FIG. 2A illustrates an exemplary schematic diagram of an IDCL cell.

FIG. 2A illustrates an exemplary schematic diagram of an IDCL cell 200. The illustrated IDCL cell 200 comprises switches 201-204, each of which is an insulated-gate bipolar transistor (IGBT) with an antiparallel diode, and voltage sharing modules 205-208. In other embodiments, each of the switches 201-204 may be an metal-oxide-semiconductor field-effect transistor (MOSFET) with an antiparallel diode or other devices. The voltage sharing modules 205-208 ensure equal voltage sharing among switches 201-204. A plurality of IDCL cells may operate together both in parallel and in series, and the voltage sharing modules ensure equal voltage sharing among all the IDCL cells that are connected in series. The IDCL cell 200 comprises three terminals 209-211. In one embodiment, the IDCL cell 200 can serve as an AC chopper where the terminals 209 and 210 constitute voltage ports which may be coupled to a voltage source, and the terminal 211 constitutes a current port that may be coupled to a current source (e.g., an inductor). As the switches 201-204 start switching, the input AC voltage across terminals 209-210 is chopped across the terminal 211, while the current through the terminal 211 is chopped between terminals 209 and 210. Multiple IDCL cells 200 may be series stacked through terminals 209 and 210 to form a single switch.

In various embodiments, the switches 201-204 are configured in close proximity to minimize parasitic while simultaneously ensuring adequate spacing exists for creepage and clearance. In further embodiments, a layer of Nomex or other insulating material may be included between the bus bars to improve insulation rating to as high as 3 kV/mm when 1 kV/mm rating associated with air is inadequate. In various embodiments, the distance of the voltage sharing module to the switch is minimal by allowing the voltage sharing module to be directly connected to the switch without wiring and harnesses, which maximizes the effectiveness of the voltage sharing module in protecting the devices. The gate drives are also configured as close as possible to the IGBTs to minimize the effects of parasitic on device switching and gate drive performance. Accordingly, the performance of the IDCL cell is maintained high to support high-frequency and high-dV/dt (instantaneous rate of voltage change) switching with a resulting compact form-factor.

Figures 2B, 2C:
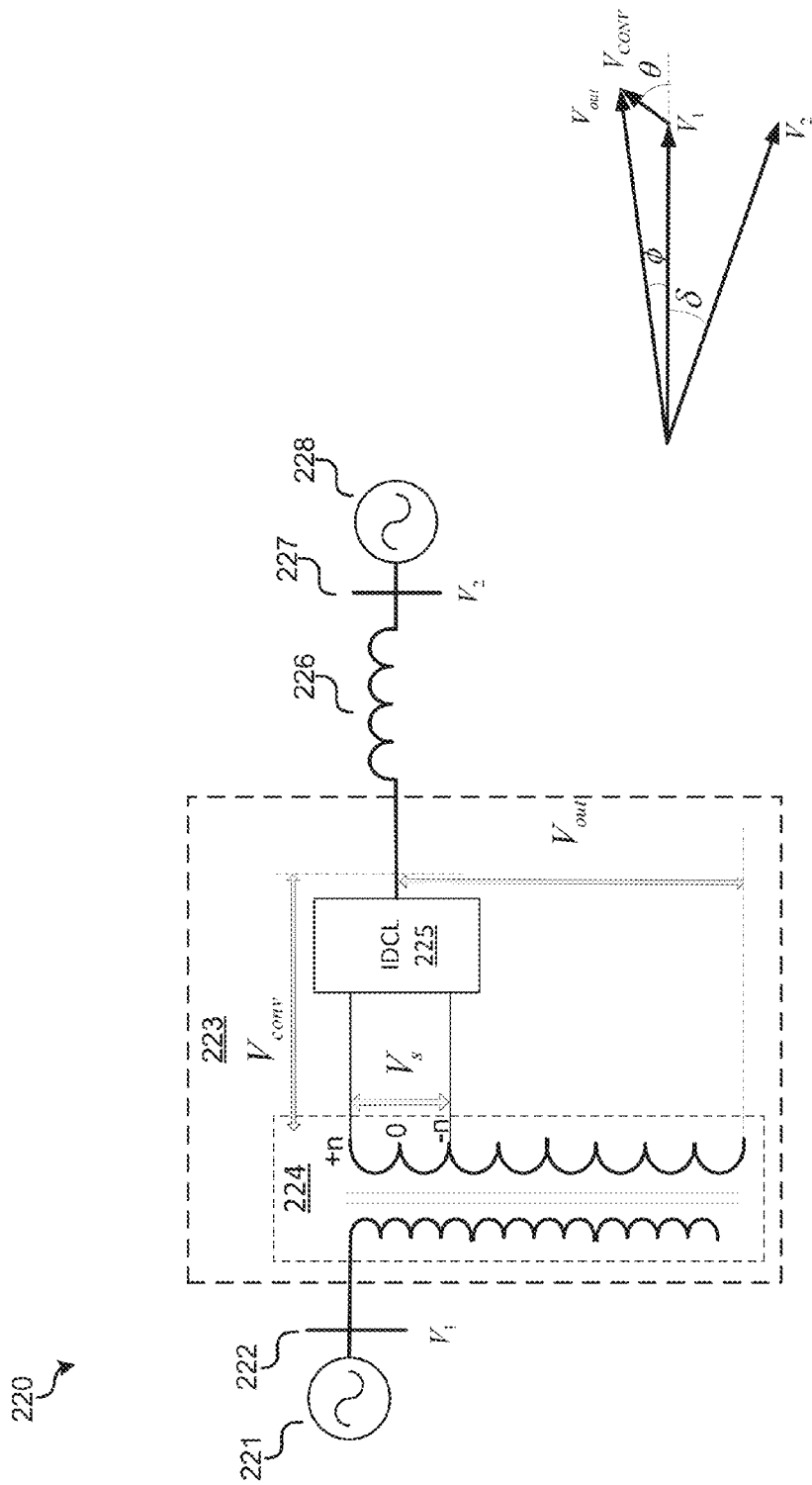
FIG. 2B is a diagram illustrating a system with an installation of a power flow controller in accordance with an embodiment of the power flow controllers based on IDCL cells.
FIG. 2C is a vector diagram illustrating principles of operation of a power flow controller based on IDCL cells in accordance with an embodiment.

FIGS. 2B and 2C illustrate principles of operation of various embodiments of the power flow controllers based on IDCL cells as described herein. FIG. 2B is a diagram illustrating a system with an installation of a power flow controller 223 in accordance with an embodiment of the power flow controllers based on IDCL cells as described herein. FIG. 2C is a vector diagram illustrating principles of operation of a power flow controller based on IDCL cells in accordance with an embodiment. The exemplary system 220 comprises two generators 221 and 228, two buses 222 and 227, and a transmission line 226. $V_1$ is the voltage at Bus 222, and $V_2$ is the voltage at Bus 227. In the illustrate example, the IDCL cell based power flow controller 223 is installed in series with the transmission line 226. The IDCL cell based power flow controller 223 performs dynamic power flow control of both active and reactive power of the power system 220. Such dynamic power flow control is achieved by actively controlling the phase and magnitude of the transformer voltage within a certain range. The IDCL cell 225 synthesizes a voltage, $V_{CONV}$, of arbitrary magnitude and phase that when summed with the transformer secondary voltage, results in a voltage, $V_{OUT}$, which may be of different magnitude and phase compared to $V_2$. As a result, the voltage $V_{out}$ may be controlled, via control of converter voltage $V_{CONV}$, to achieve both active and reactive power flow control.

Referring to FIG. 2C, as illustrated, the initial phase difference between bus 222 voltage $V_1$ and bus 227 voltage $V_2$ is $\delta$. The power flow controller 223 inserts a voltage $V_{CONV}$ to $V_1$, which creates the output voltage $V_{out}$. The output voltage $V_{out}$ and the Bus 227 voltage $V_1$ may have different phases and amplitudes. The amplitude of the output voltage $V_{out}$ may be adjusted by adjusting the amplitude of the inserted voltage $V_{CONV}$. This is achieved through constant duty cycle control of the switches of the IDCL cell 225 and allows control over reactive power flow. Further, the phase difference between the output voltage $V_{out}$ and the Bus 227 voltage $V_2$ is ($\delta+\phi$), which may be adjusted by adjusting the phase angle of the inserted voltage $V_{CONV}$. This is achieved by modulating the switches in accordance with Virtual Quadrature Sources (VQS) (described in the U.S. Pat. No. 8,179,702, entitled "Voltage Synthesis Using Virtual Quadrature Sources"), for example, with an even harmonic. In one embodiment, the switch duty is modulated with a constant plus a second harmonic. As such, control of both active power and reactive power is achieved as the active power transferred between buses 222 and 227 is given by $$P = \frac{V_{out}V_2}{X_{Line}} \sin(\delta + \phi),$$

where $X_{Line}$ is the line impedance and is primarily a function of phase angle difference, ($\delta+\phi$), and the reactive power transferred between buses 222 and 227 is given by $$Q = \frac{V_{out}V_2}{X_{Line}} \left( \cos(\delta + \phi) - \frac{V_{out}}{V_1} \right),$$

where $X_{Line}$ is the line impedance and is primarily a function of the voltage amplitudes $V_{out}$ and $V_2$.

The series voltage $V_{CONV}$ that the power flow controller can generate is a function of the input voltage $V_S$, which in turn depends on the transformer taps across which the IDCL cell is connected and the duty cycle D of the IDCL cell:

$$V_{out} = \left( \frac{D}{1+n} + \frac{1-D}{1-n} \right) V_1.$$

In one embodiment, the switches 201-204 are regulated such that the duty cycle D of the IDCL cell 200 is given:

$$d_{abc}(t) = \begin{bmatrix} K_0 + K_2\sin(2\omega t + \phi_2) \\ K_0 + K_2\sin\left(2\omega t + \frac{2\pi}{3} + \phi_2\right) \\ K_0 + K_2\sin\left(2\omega t - \frac{2\pi}{3} + \phi_2\right) \end{bmatrix}$$

Accordingly, the output voltage is:

$$V_{out} = \left( \frac{D}{1+n} + \frac{1-D}{1-n} \right) V_1$$
$$= V_1(A\sin(\omega t) - B\cos(\omega t + \phi)) + BV_1\cos(3\omega t)$$

where $$A = \frac{1+n-2K_0n}{1-n^2} \cdot B = \frac{nK_2}{1-n^2}.$$

$K_2 \leq \min\{K_0, 1-K_0\}$, and n is the transformer turns ratio.

The control range of the power flow controller is a function of the input voltage $V_S$, line impedance $X_{Line}$, and the phase difference $\delta$ between the sending end voltage $V_1$ and the receiving end voltage $V_2$. The active power P, and the sending-end reactive power, $Q_1$, at Bus 222 may be reformulated with the duty cycle function of the converter included and are given in Equations (1) and (2) respectively:

$$P = \frac{V_{out}V_2}{X} \sin(\delta + \phi) = \frac{V_1V_2}{X}(A\sin\delta - B\cos(\delta + \phi)) \quad (1)$$

$$Q_1 = \frac{V_{out}}{X}(V_{out} - V_2\cos(\delta + \phi)) \quad (2)$$
$$= \frac{V_1^2}{X}\left(A^2 - \frac{2}{3}B^2\right) - \frac{AV_1V_2}{X}\cos\delta + \frac{BV_1V_2}{X}\sin\delta$$

where $$A = \frac{1+n-2K_0n}{1-n^2} \cdot B = \frac{nK_2}{1-n^2} \cdot K_2 \leq \min\{K_0, 1-K_0\}.$$

Factor A depends on the DC component $K_0$ of the duty cycle, and factor B depends on the second harmonic magnitude $K_2$. $K_0$ affects reactive power control whereas $K_2$ affects real power flow control. Thus, by regulating these two parameters of the duty cycle function of the IDCL cell, both real and reactive power flow may be controlled.

Figure 2D:
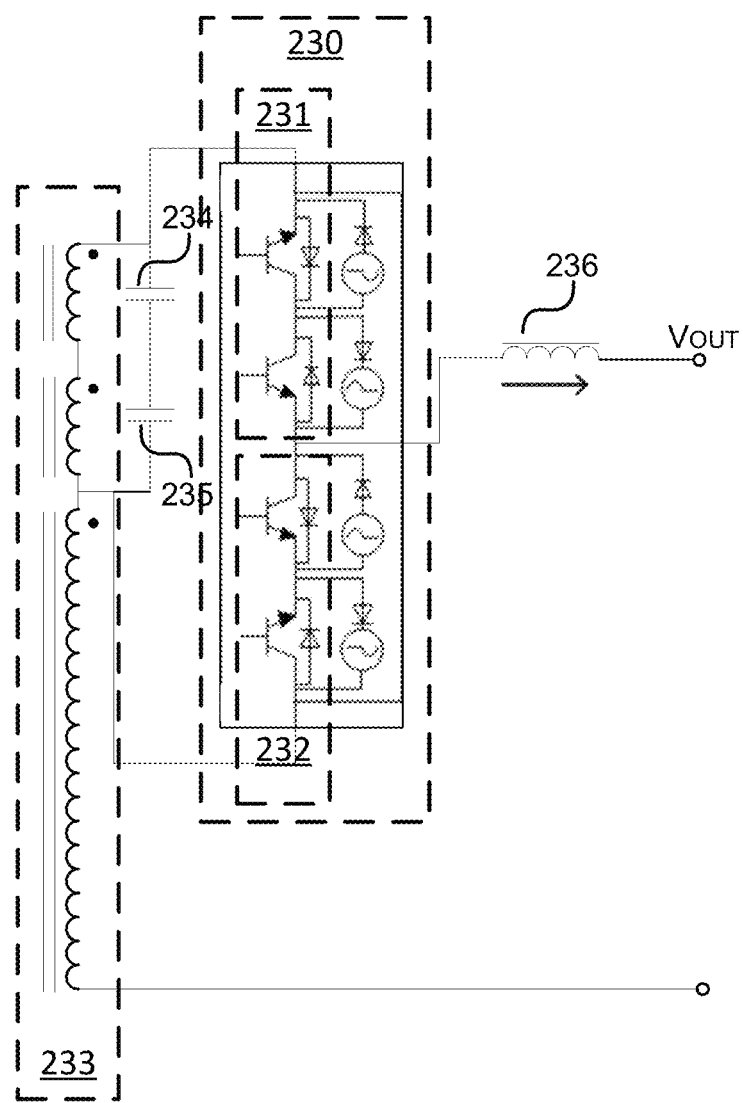
FIG. 2D illustrates implementation of an IDCL cell based 2-level direct AC/AC converter with power flow control capabilities.

FIG. 2D illustrates implementation of an IDCL cell based 2-level direct AC/AC converter with power flow control capabilities. The direct 2-level IDCL cell-based power flow controller comprises an IDCL cell 230, a transformer 233, filter capacitors 234-235, and an output inductor filter 226. In the illustrated example, the IDCL cell 220 is coupled to the transformer 223 between two taps. The illustrated IDCL cell based power flow controller is an example of a power converter augmented transformer (PCAT).

Figure 2E:
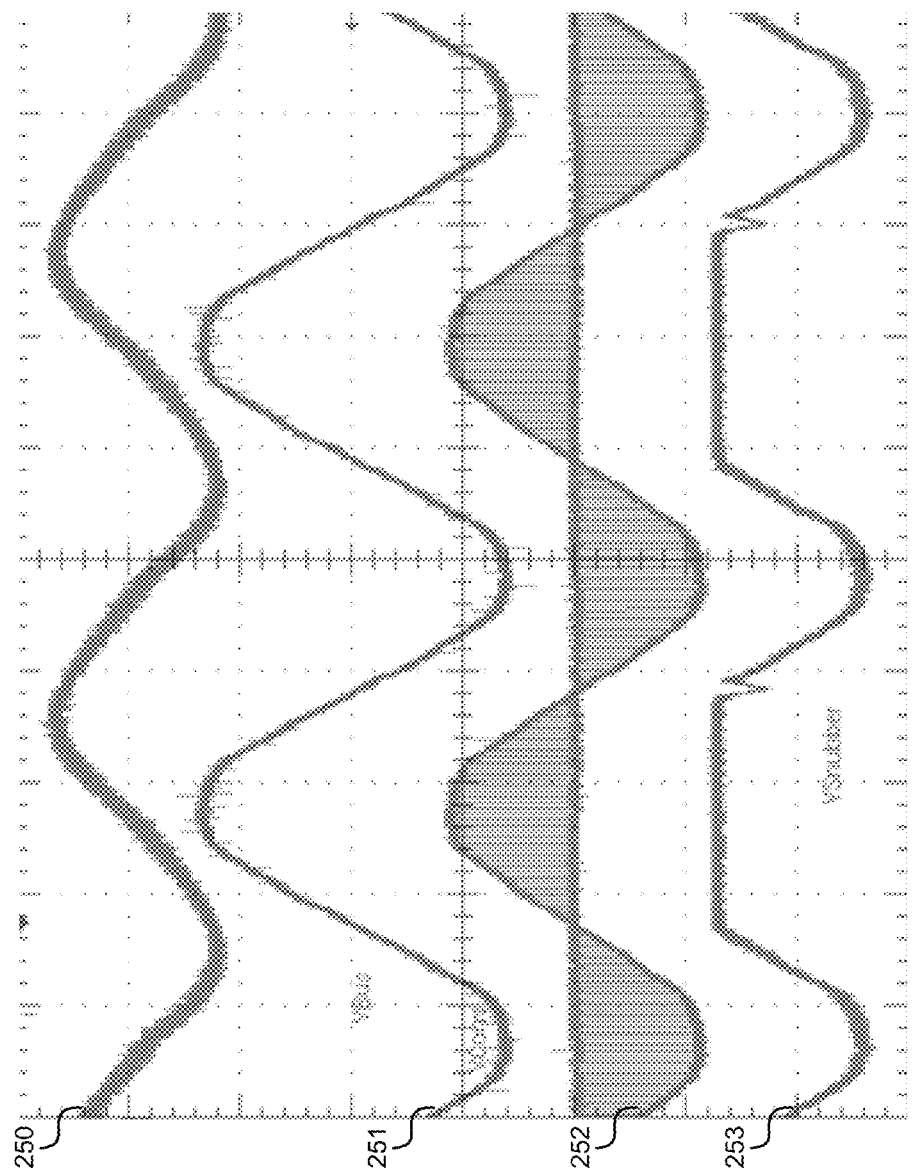
FIG. 2E illustrates operational waveforms of a 2-level IDCL cell-based AC/AC converter.
Figure 2F:
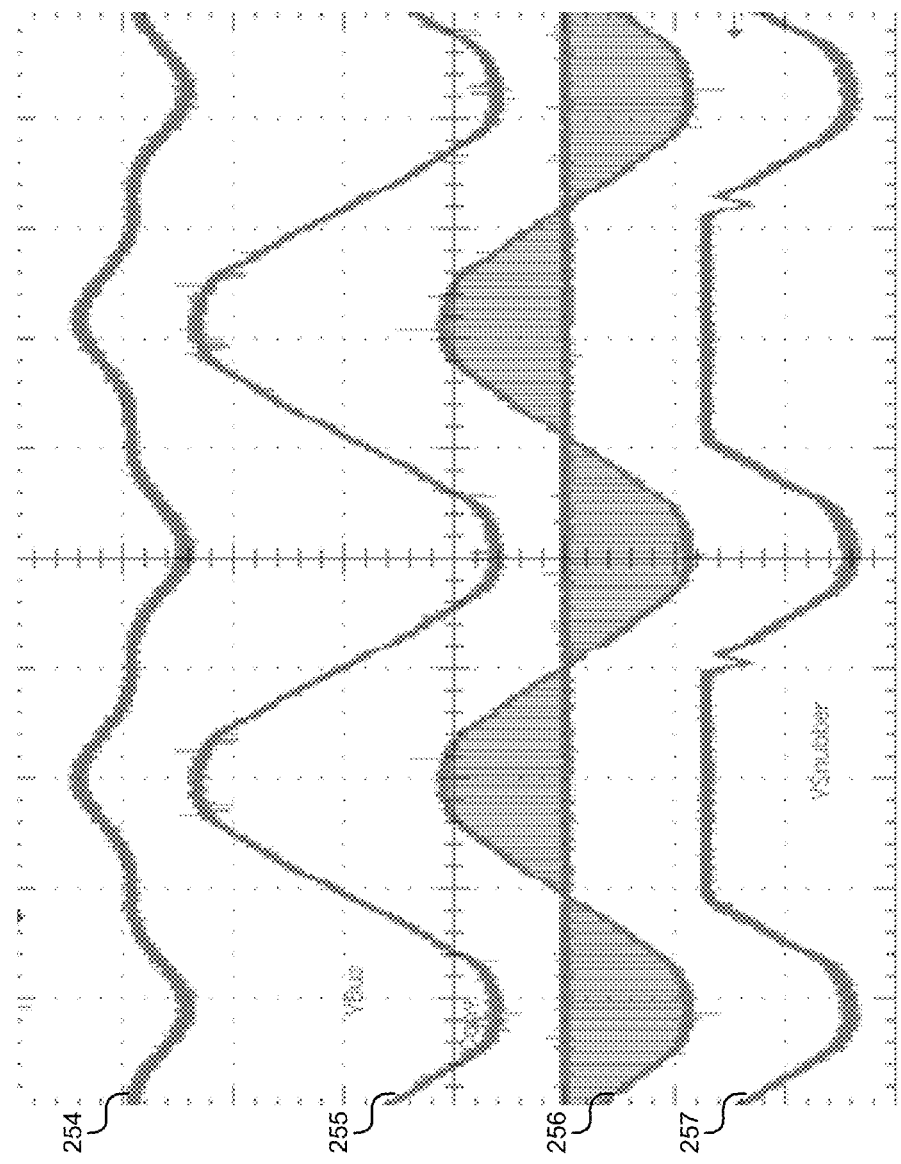
FIG. 2F illustrates operational waveforms of a 2-level IDCL cell-based AC/AC converter.

FIGS. 2E-2F illustrate operational waveforms of a 2-level IDCL cell-based AC/AC converter. Waveform 250 and 254 illustrate the output line current. Waveforms 251 and 255 illustrate the bus voltage. Waveforms 252 and 256 illustrate the converter voltage. Waveform 253 and 257 illustrate the voltage of the voltage sharing module. As illustrated in 2C, with the implementation of the power flow controller, the effective voltage at two buses are controlled to be different, either in magnitude or in phase or both.

Figure 3:
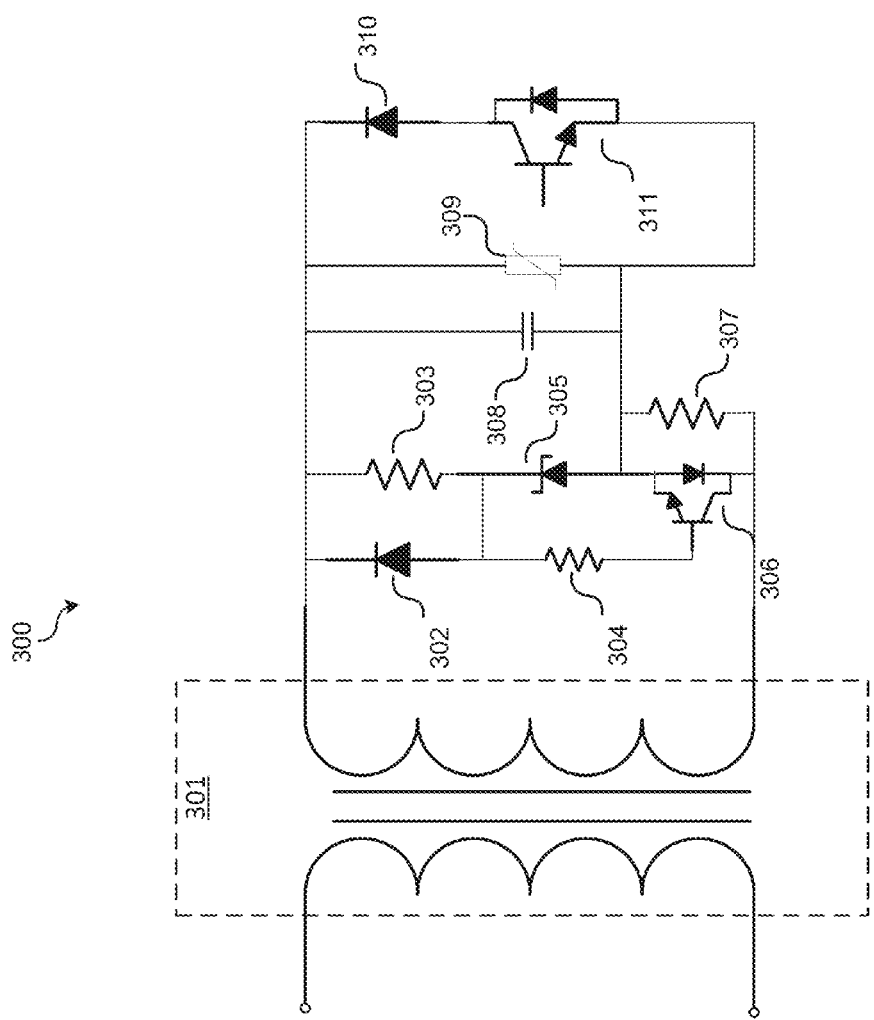
FIG. 3 illustrates an exemplary circuit diagram of a voltage sharing module.

FIG. 3 illustrates an exemplary circuit diagram of a voltage sharing module 300. In the illustrated example, the voltage sharing module is an active snubber. The active snubber may be integrated into each switch of an IDCL cell. This implementation of the active snubber 300 is not dissipative, but rather replenishes the energy back into the source, thereby increasing the overall efficiency of any IDCL cell based converter. In the illustrated example, an active snubber may comprise a low frequency transformer 301 which provides energy transfer from the line voltage to the snubber capacitor 308. Turns ratio of the transformer 301 are appropriately set in order to control the voltage magnitude across the snubber capacitor 308 to be slightly higher than the actual blocking voltage in order to reverse bias the snubber diodes.

The active snubber 300 compares the voltage across the IDCL switch 311 to be an in-phase, half-wave-rectified sine wave that mimics the ideal voltage across the switch 311. This voltage is created by using the snubber switch 306 to half-wave rectify a copy of the input voltage, which is provided by the transformer 301. At any time, if the switch 311 in the IDCL encounters an incorrect switching pattern as a result of incorrect commutation sequence or unequal voltage sharing between devices, the snubber diode 310 becomes forward biased and the voltage difference will be equalized by the snubber capacitor 308, which shuffles any extra energy back to the AC source.

The active snubber 300 is self-driven and does not need any external gate pulses for switching the snubber switch 306. Diodes 302, 305, and 310, resistors 303, 304, and 307 are the associated circuitry to self-drive the snubber switch device 306. In various embodiments, the snubber switch device 306 may be IGBT, MOSFET or other devices. In order to dissipate large amount of energy during fault contingencies when devices are turned off suddenly, a Metal-oxide Varistor (MOV) 309 may be placed in parallel. The MOV 309 clamps the capacitor voltage within certain level and dissipates the excess energy, protecting both the main devices of an IDCL cell and the snubber circuitry. As such, the MOV 309 provides protection that absorbs larger spikes of energy that may occur due to external faults.

Figure 4A:
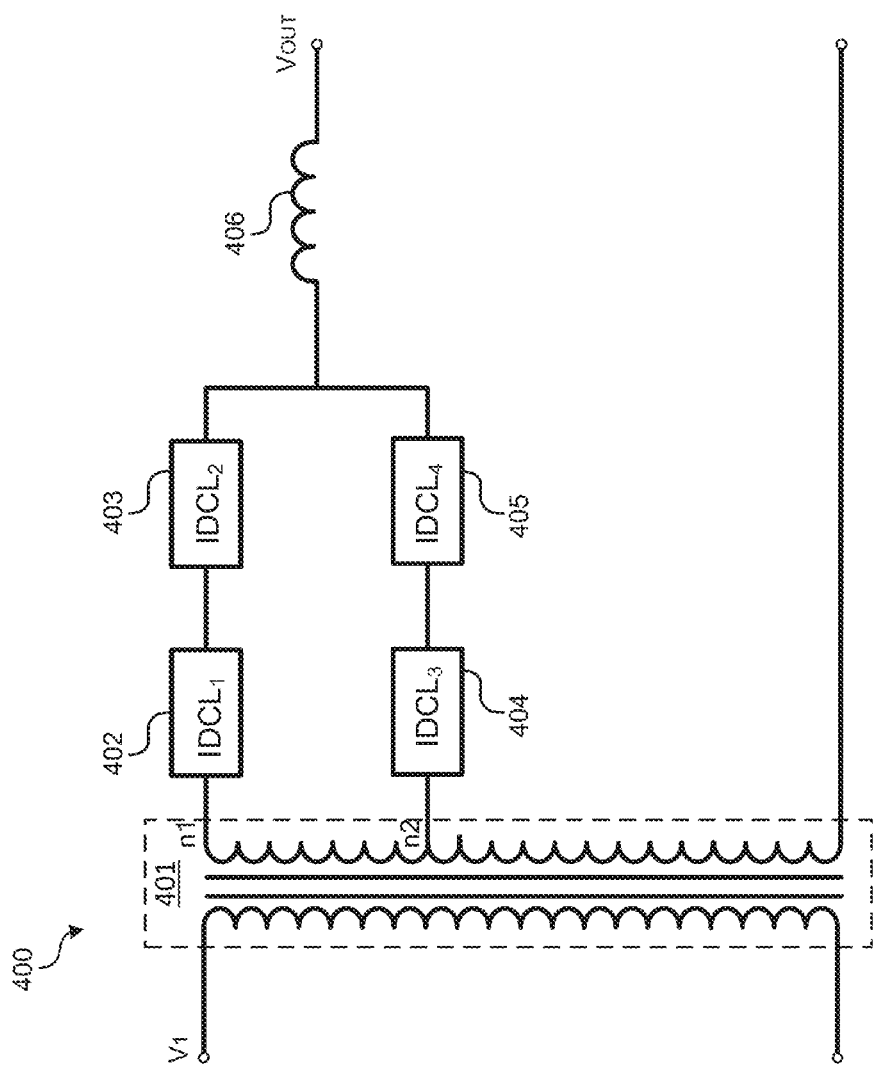
FIG. 4A illustrates an exemplary IDCL based 2-level AC/AC converter with two series connected cells forming a single switch.

FIG. 4A illustrates an exemplary IDCL based 2-level AC/AC converter 400 with two series connected cells forming a single switch. The IDCL based 2-level AC/AC converter 400 comprises a transformer 401, IDCL cells 402-405, and an output filter inductor 406. Each of the IDCL cells 402-405 may be implemented as described in FIG. 2 and each IDCL cell functions as a switch. The illustrated 2-level AC/AC converter 400 comprises two terminals. One terminal is connected to the n1 tap of the transformer 401, and the other terminal is connected to the n2 tap of the transformer 401. The IDCL cells are switched between n1 and n2 taps of the transformer 401. In some embodiments, the IDCL cell based 2-level AC/AC converter 400 may be deployed by retrofitting the transformer 401 to form a power converter augmented transformer (PCAT). The transformer 401 is augmented with the IDCL cells 402-405. As such, the originally passive transformer 401 can now provide power flow control capabilities.

Figure 4B:
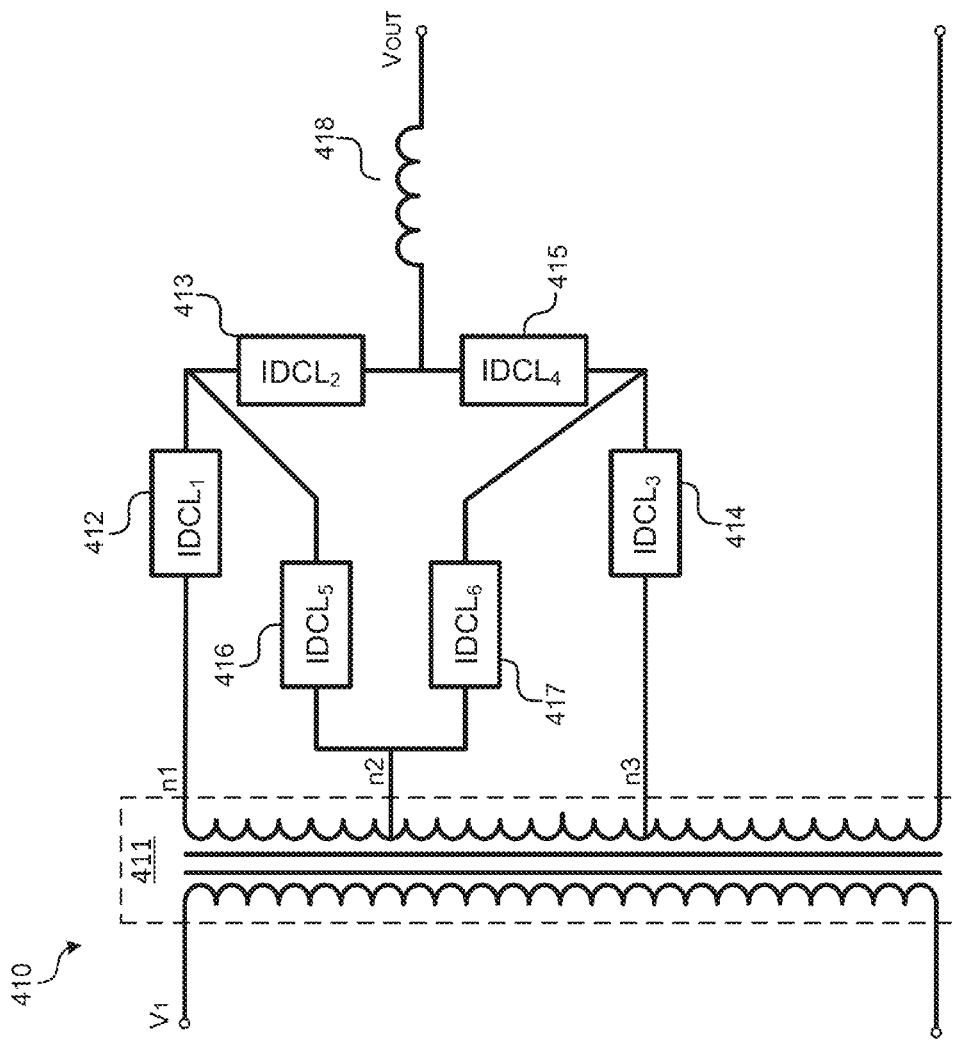
FIG. 4B illustrates an exemplary IDCL based 3-level AC/AC converter.

FIG. 4B illustrates an exemplary IDCL based 3-level AC/AC converter 410. The IDCL based 3-level AC/AC converter 410 comprises a transformer 411, IDCL cells 412-417, and an output filter inductor 418. Each of the IDCL cells 412-417 may be implemented as described in FIG. 2. The illustrated 3-level AC/AC converter 410 comprises three inputs. A first input is coupled to the n1 tap of the transformer 411, a second input is coupled to the n2 tap of the transformer 411, and a third input is coupled to the n3 tap of the transformer 411. The IDCL cells are switched between n1, n2, and n3 taps of the transformer 401. In some embodiments, the IDCL cell based 3-level AC/AC converter 410 may be deployed by retrofitting the transformer 411 to form a power converter augmented transformer (PCAT). The transformer 411 is augmented with the IDCL cells 412-417. As such, the originally passive transformer 411 may provide power flow control capabilities.

Figure 4C:
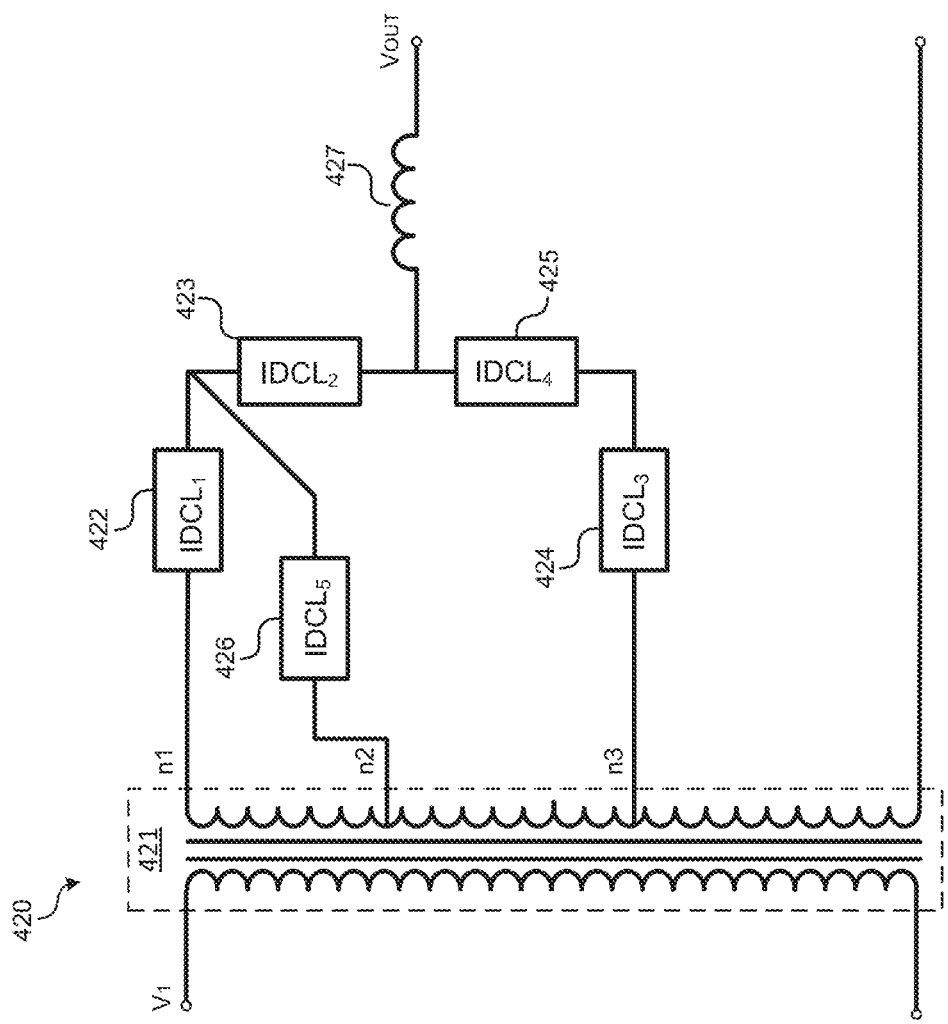
FIG. 4C illustrates an exemplary reduced IDCL based 3-level AC/AC converter.

FIG. 4C illustrates an exemplary reduced IDCL based 3-level AC/AC converter 420. The IDCL based 3-level AC/AC converter 420 comprises a transformer 421, IDCL cells 422-426, and an output filter inductor 427. Each of the IDCL cells 422-426 may be implemented as described in FIG. 2. The voltage sharing modules comprised in each IDCL cell ensures voltage sharing between series connected switches. Compared with the 3-level AC/AC converter 410 as illustrated in FIG. 4B, individual devices are switched more frequently for the same effective switching frequency on the output in the reduced IDCL based 3-level AC/AC converter 420, which may result in a marginal increase in switching losses. However, the lower device count reduces overall converter costs.

Figure 4D:
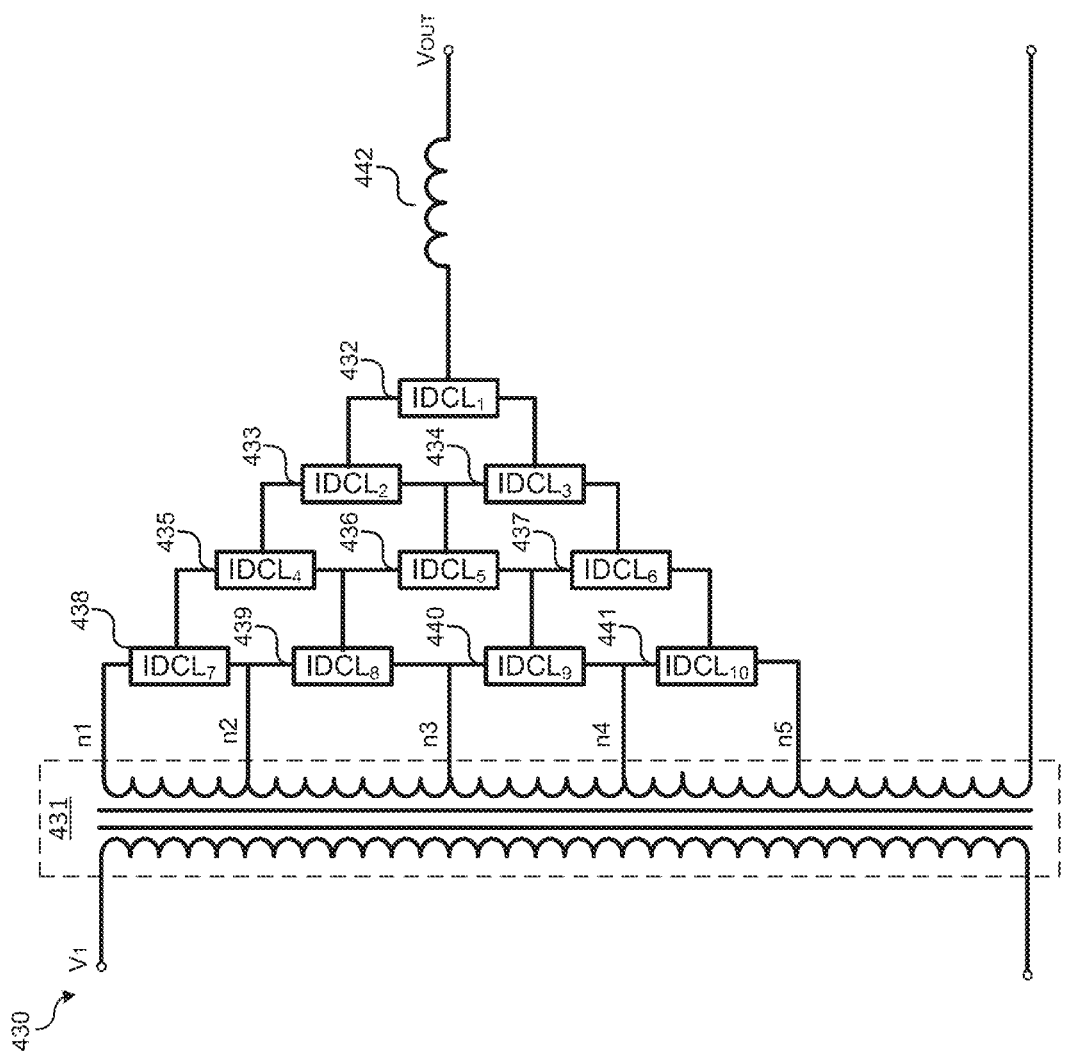
FIG. 4D illustrates an exemplary IDCL based 5-level AC/AC converter.

FIG. 4D illustrates an exemplary IDCL based 5-level AC/AC converter 430. The IDCL based 5-level AC/AC converter 430 comprises a transformer 431, IDCL cells 432-441, and an output filter inductor 442. Each of the IDCL cells 432-441 may be implemented as described in FIG. 2. The illustrated 5-level AC/AC converter 430 comprises five inputs, each of which is coupled to a corresponding tap of the transformer 411. The IDCL cells are switched between n1-n5 taps of the transformer 401. In some embodiments, the IDCL cell based 5-level AC/AC converter 430 may be deployed by retrofitting the transformer 431 to form a power converter augmented transformer (PCAT). The transformer 431 is augmented with the IDCL cells 432-441. As such, the originally passive transformer 431 may provide power flow control capabilities.

Figure 4E:
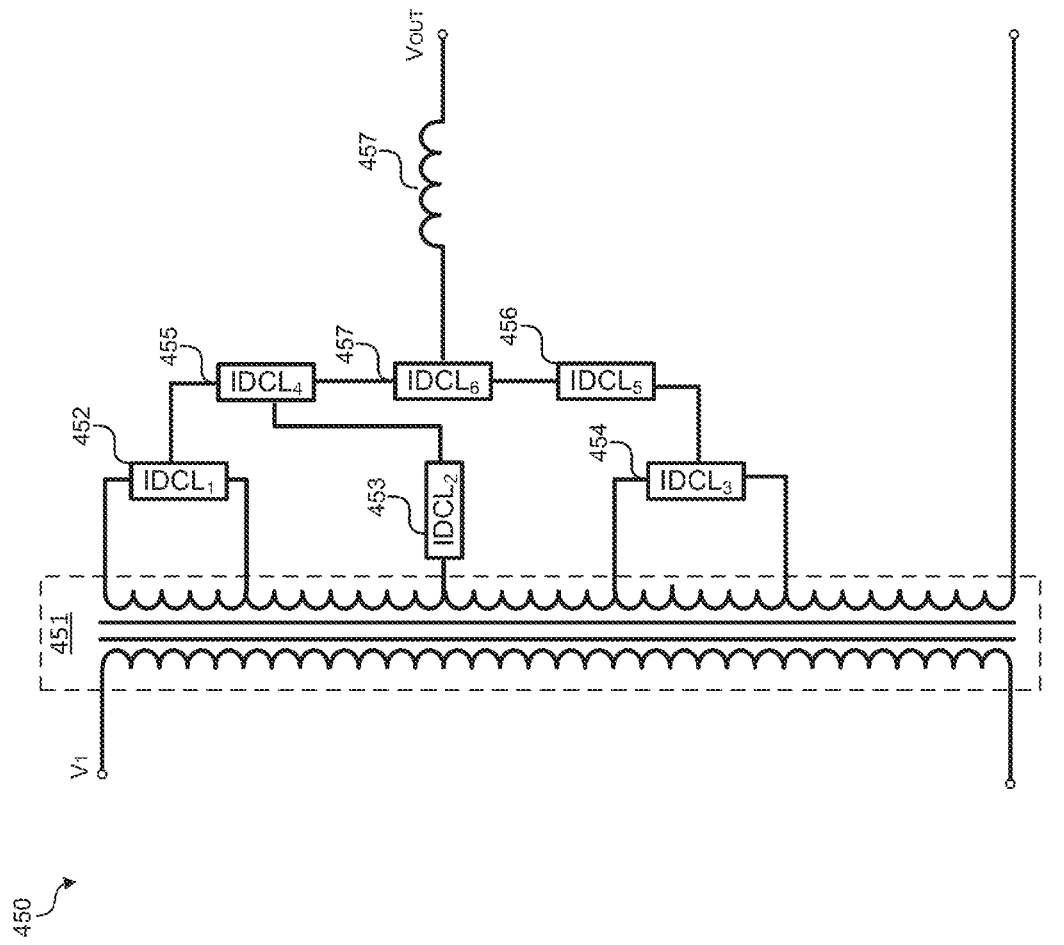
FIG. 4E illustrates an exemplary reduced IDCL based 5-level AC/AC converter.

FIG. 4E illustrates an exemplary reduced IDCL based 5-level AC/AC converter 450. The IDCL based 5-level AC/AC converter 450 comprises a transformer 451, IDCL cells 452-457, and an output filter inductor 451. Each of the IDCL cells 452-457 may be implemented as described in FIG. 2. The voltage sharing modules comprised in each IDCL cell ensures equal voltage sharing between series connected switches. Compared with the 5-level AC/AC converter 430 as illustrated in FIG. 4D, individual devices are switched more frequently for the same effective output switching frequency in the reduced IDCL based 5-level AC/AC converter 450, which may result in a marginal increase in switching losses. However, the lower device counts reduce overall converter costs.

In various embodiments, the higher-level topologies allow converter voltages to be scaled up while still using low-rated switches, enabling power flow controllers to operate at higher voltages. Furthermore, with multi-level topologies, devices can operate at a lower switching frequency to reduce losses while synthesizing output waveforms with lower THD, which require smaller switching filters.

Figure 4F:
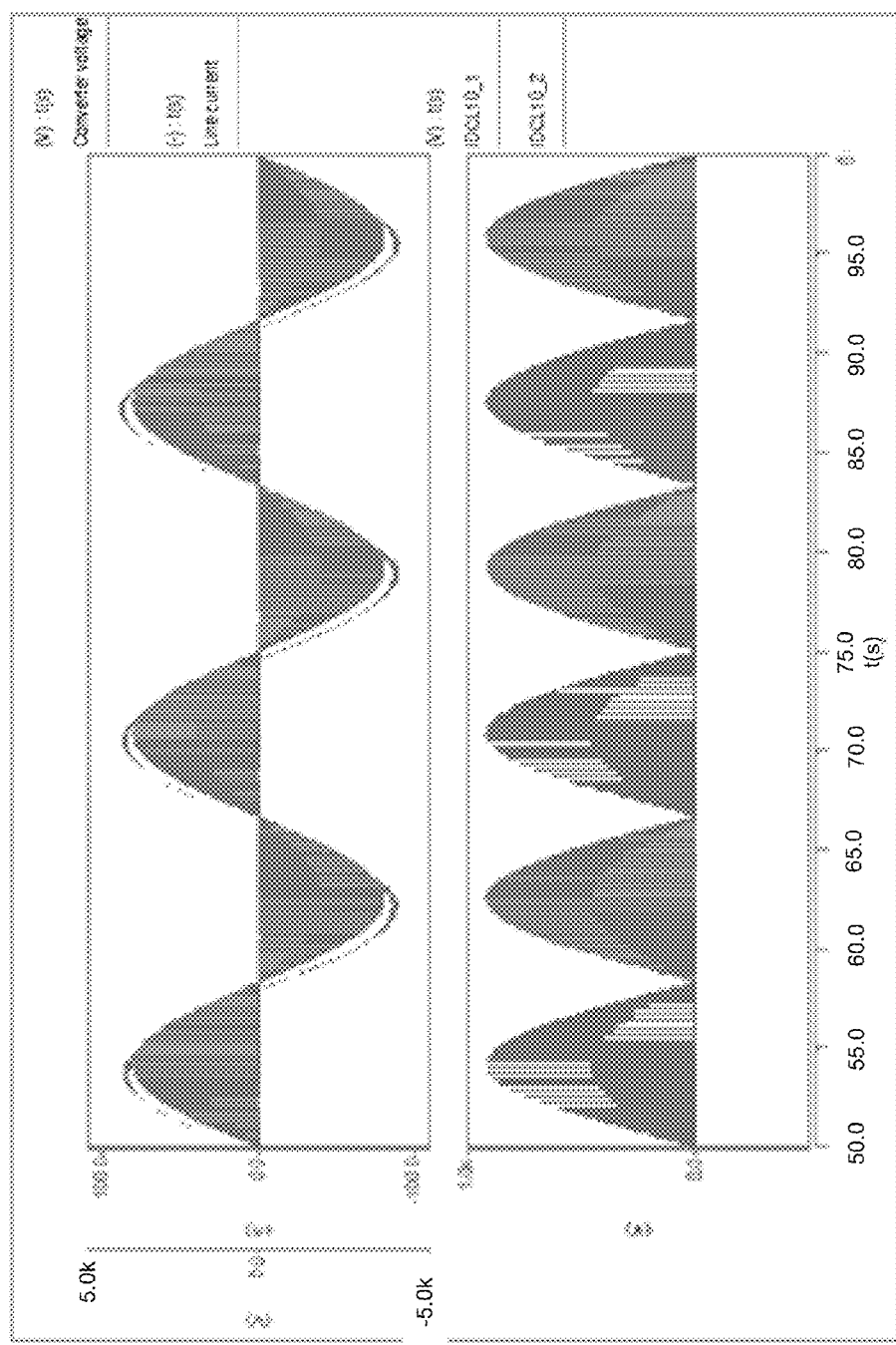
FIG. 4F are simulation results illustrating characteristic waveforms of a 2-level IDCL cell based converter.
Figure 4G:
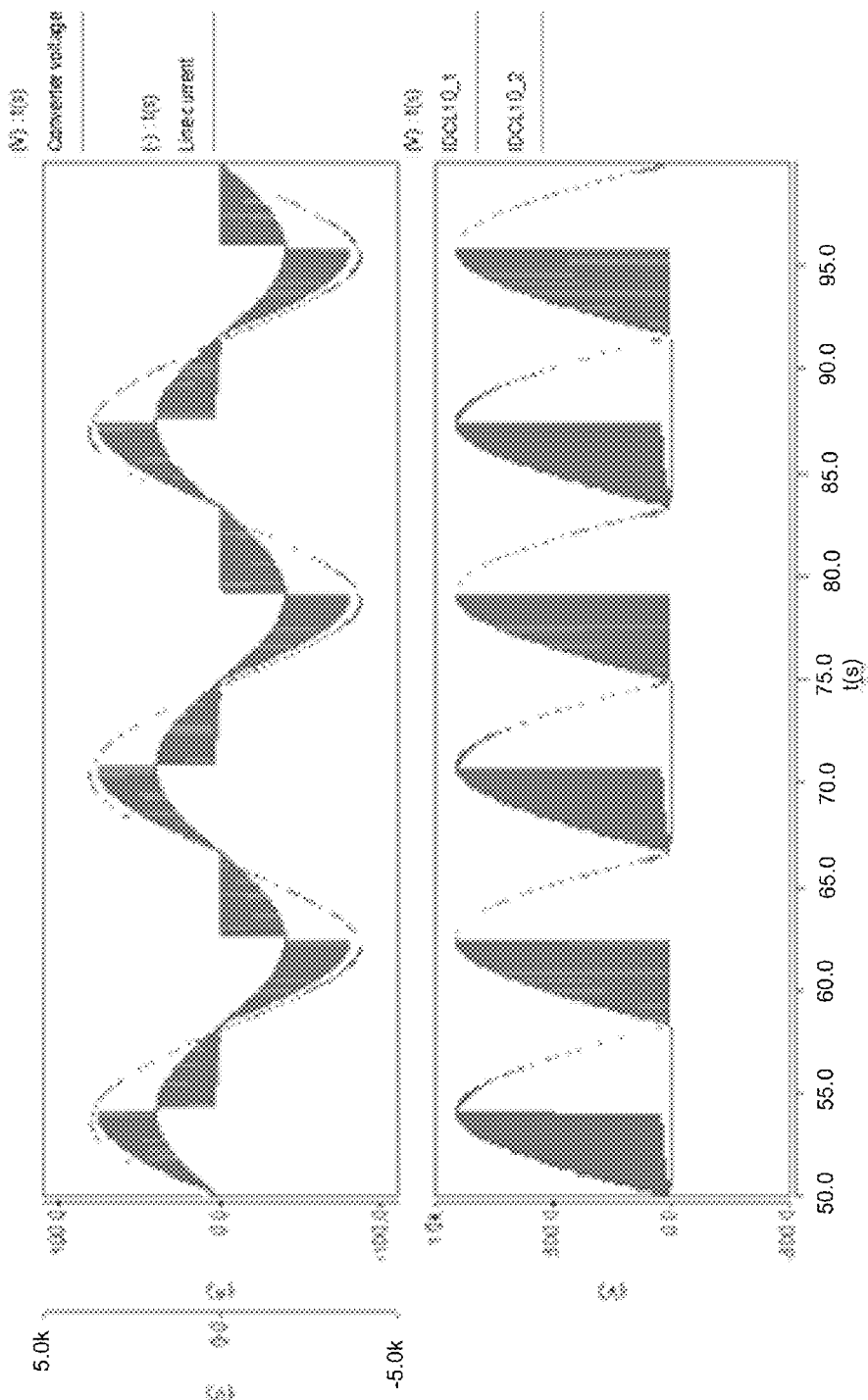
FIG. 4G are simulation results illustrating characteristic waveforms of a 3-level IDCL cell based converter.
Figure 4H:
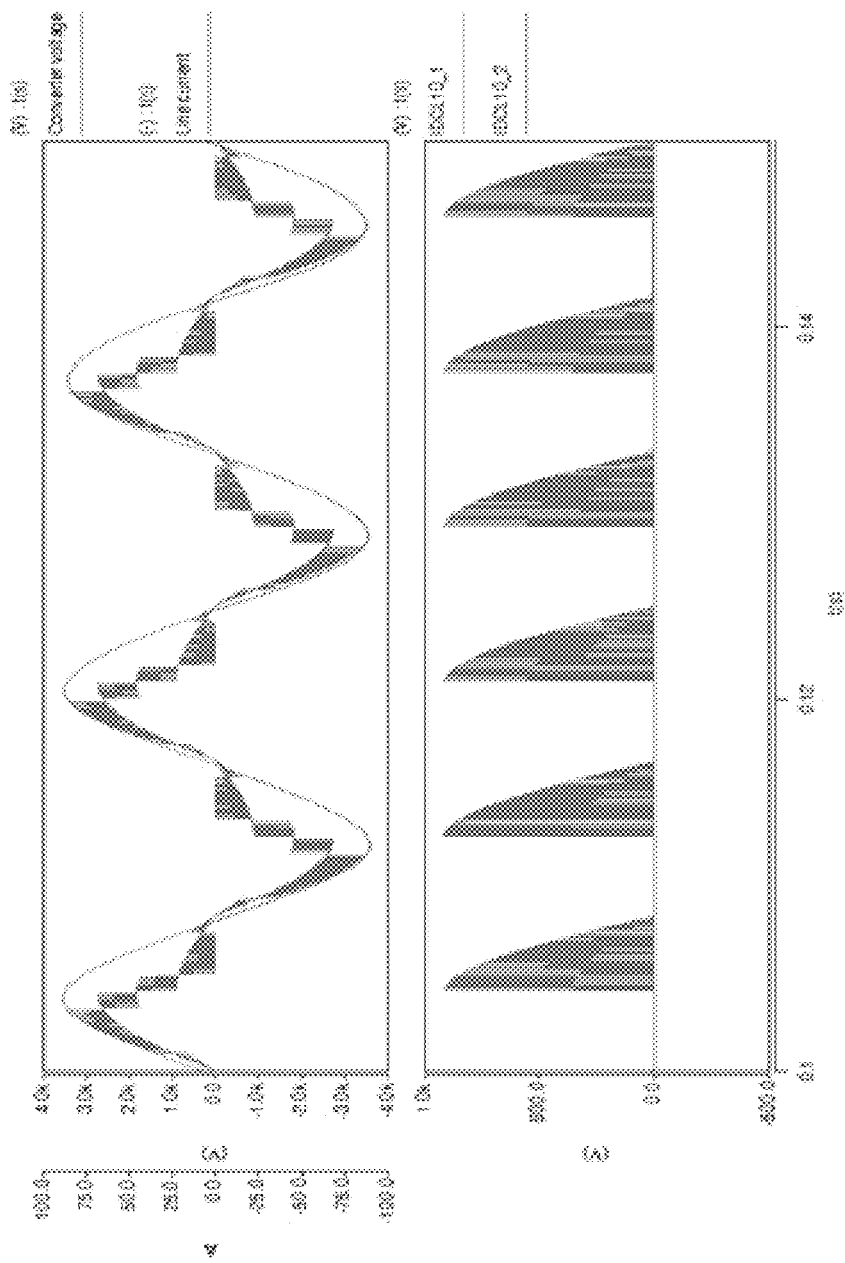
FIG. 4H are simulation results illustrating characteristic waveforms of a 5-level IDCL cell based converter.

FIG. 4F-H are simulation results illustrating characteristic waveforms of a 2-level IDCL cell based converter, a 3-level IDCL cell based converter, and a 5-level IDCL cell based converter, respectively. As illustrated in FIGS. 4F-4H and Table 1, for the same input/output voltages and currents, the 3-level converter is able to operate with lower device frequencies and lower device stresses when compared to a 2-level converter topology. While similarly, the 5-level converter operates at an even lower frequency and with lower stresses.

TABLE 1

Comparison of IDCL Cell-based AC/AC Converter Topologies

| Specification | 2-Level AC/AC Converter | 3-Level AC/AC Converter | 5-Level AC/AC Converter |
|---|---|---|---|
| Devices | 16 | 24 | 40 |
| Voltage Sharing Modules | 16 | 24 | 40 |
| Average Device Frequency | 50 kHz | 25 kHz | 12.5 kHz |
| Maximum dV/dt | High | Medium | Low |
| Voltage Total Harmonic Distortion | Poor | Good | Excellent |

Figure 5:
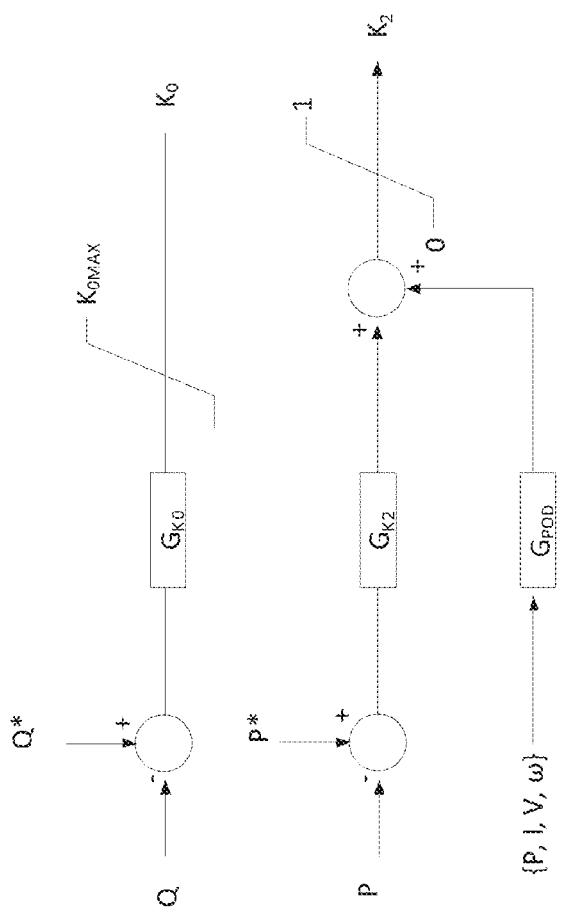
FIG. 5 illustrates an example control block diagrams of various embodiments.

FIG. 5 illustrates control block diagrams of various embodiments. In various embodiments, the duty cycle controlling each of the IDCL cell may be described as:

$$d_{abc}(t) = \begin{bmatrix} K_0 + K_2 \sin(2\omega t + \phi_2) \\ K_0 + K_2 \sin\left(2\omega t + \frac{2\pi}{3} + \phi_2\right) \\ K_0 + K_2 \sin\left(2\omega t - \frac{2\pi}{3} + \phi_2\right) \end{bmatrix}$$

The primary control variables are $K_0$, $K_2$, and $\phi_2$. $K_0$ is used to affect reactive power while $K_2$ is used to control real power. $K_0$ may be varied between the range of [0,1]. $\phi_2$ may be used to provide a third degree of control. Accordingly, the two loops are saturated such that this range is never exceeded.

The compensators, $G_{k0}$ and $G_{K2}$, are used to regulate reactive and real power, respectively. The compensator $G_{POD}$ is used to provide power oscillation dampening, of which the feedback variable may be power, voltage, current, and/or line frequency.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the invention using other computing modules or architectures.

Figure 6:
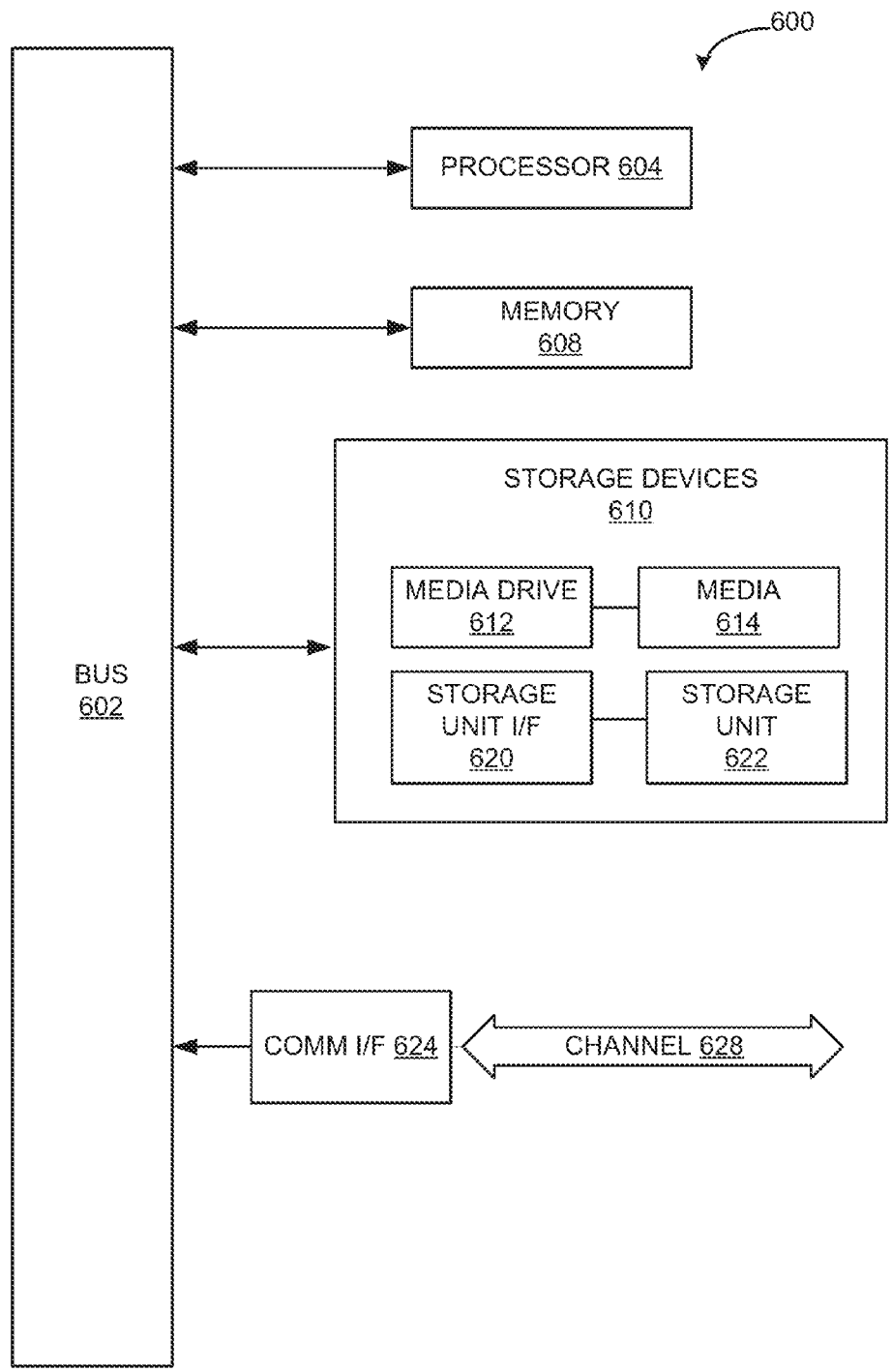
FIG. 6 illustrates an example computing module that may be used in implementing various features of embodiments of the invention.

Referring now to FIG. 6, computing module 600 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. An apparatus for controlling power flow between a first AC source and a second AC source, comprising:
    an imputed DC link (IDCL) cell comprising:
        a plurality of power switches;
        a voltage sharing module coupled across each of the plurality of power switches, wherein the plurality of power switches share voltage equally; and
        a transformer coupled to the IDCL cell, wherein an input voltage to the IDCL cell is a fraction of a voltage of the first AC source.

2. The apparatus of claim 1, wherein the plurality of power switches are four IGBTs.

3. The apparatus of claim 1, further comprising a control module, wherein the control module generates a set of switching pulses to modulate the plurality of power switches.

4. The apparatus of claim 1, wherein the voltage sharing module is an active snubber, the active snubber projecting a half-wave rectified waveform across each power switch.

5. The apparatus of claim 1, further comprising a set of IDCL cells, wherein the set of IDCL cells are coupled in series and share voltage equally.

6. The apparatus of claim 1, further comprising a set of IDCL cells, wherein the set of IDCL cells are coupled in parallel.

7. An apparatus for controlling power flow between a first AC source and a second AC source, comprising:
    an imputed DC link (IDCL) cell comprising:
        a plurality of power switches, wherein the plurality of power switches are four IGBTs; and
        a voltage sharing module coupled across each of the plurality of power switches, wherein the plurality of power switches share voltage equally;
        wherein the plurality of power switches are coupled to form an AC chopper, ai a collector of the first IGBT is coupled to a collector of the second IGBT, the emitter of the second IGBT is coupled to the collector of the third IGBT, and the emitter of the third IGBT is coupled to the emitter of the fourth IGBT.

8. A method of converting a passive device between a first AC source and a second AC source to a power flow controller controlling the power flow between the first AC source and a second AC source, comprising:
  coupling an imputed DC link (IDCL) cell to the passive device, wherein the imputed DC link cell comprising:
    a plurality of power switches, the plurality of power switches coupled as an AC chopper; and
    a voltage sharing module coupled across each of the plurality of power switches, wherein the plurality of power switches share voltage equally;
  wherein the passive device is a transformer and an input voltage to the IDCL cell is a fraction of a voltage of the first AC source.

9. The method of claim 8, wherein the plurality of power switches are four IGBTs.

10. The method of claim 8, further comprising generating a set of switching pulses to modulate the plurality of power switches.

11. The method of claim 8, wherein the voltage sharing module is an active snubber, the active snubber projecting a half-wave rectified waveform across each power switch.

12. A method of converting a passive device between a first AC source and a second AC source to a power flow controller controlling the power flow between the first AC source and a second AC source, comprising:
  coupling an imputed DC link (IDCL) cell to the passive device, wherein the imputed DC link cell comprising:
    a plurality of power switches, wherein the plurality of power switches are four IGBTs, the plurality of power switches coupled as an AC chopper; and
    a voltage sharing module coupled across each of the plurality of power switches, wherein the plurality of power switches share voltage equally;
  wherein the plurality of power switches are coupled to form an AC chopper, an collector of the first IGBT is coupled to an collector of the second IGBT, the emitter of the second IGBT is coupled to the collector of the third IGBT, and the emitter of the third IGBT is coupled to the emitter of the fourth IGBT.

\* \* \* \* \*